United States Patent
Chen et al.

(10) Patent No.: US 7,514,930 B2
(45) Date of Patent: *Apr. 7, 2009

(54) APPARATUS AND METHOD FOR ADDRESSING BOREHOLE ECCENTRICITY EFFECTS

(75) Inventors: Kuo-Chiang Chen, Sugar Land, TX (US); Hanming Wang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/707,274

(22) Filed: Dec. 2, 2003

(65) Prior Publication Data

US 2005/0116718 A1    Jun. 2, 2005

(51) Int. Cl.
*G01V 3/02* (2006.01)
(52) U.S. Cl. ......................... 324/339; 324/351
(58) Field of Classification Search ................. 324/351, 324/338–343, 332, 333, 346–348, 336, 370, 324/374, 375
See application file for complete search history.

(56) References Cited

U.S. PATENT DOCUMENTS

| | | | |
|---|---|---|---|
| 4,319,191 A | 3/1982 | Meador et al. | |
| 4,651,101 A | 3/1987 | Barber et al. | |
| 4,873,488 A | 10/1989 | Barber et al. | |
| 5,041,975 A | 8/1991 | Minerbo et al. | |
| 5,235,285 A | 8/1993 | Clark et al. | |
| 5,508,616 A | 4/1996 | Sato et al. | |
| 5,757,191 A | 5/1998 | Gianzero | |
| 5,781,436 A | 7/1998 | Forgang et al. | |
| 6,044,325 A | 3/2000 | Chakravarthy et al. | |
| 6,147,496 A | 11/2000 | Strack et al. | |
| 6,297,639 B1 | 10/2001 | Clark et al. | |
| 6,304,086 B1 | 10/2001 | Minerbo et al. | |
| 6,351,127 B1 | 2/2002 | Rosthal et al. | |
| 6,380,744 B1 | 4/2002 | Clark et al. | |
| 6,541,979 B2 | 4/2003 | Omeragic | |
| 6,556,015 B1 | 4/2003 | Omeragic et al. | |
| 6,557,794 B2 | 5/2003 | Rosthal et al. | |

(Continued)

FOREIGN PATENT DOCUMENTS

GB    2376076    12/2002

(Continued)

*Primary Examiner*—Reena Aurora
(74) *Attorney, Agent, or Firm*—Darla P. Fonseca; Jaime Castano

(57) ABSTRACT

A well logging tool apparatus is disclosed for conducting measurements in a borehole environment surrounding a borehole that traverses a subsurface formation. The apparatus includes an elongated conductive mandrel having a longitudinal axis, an antenna array positioned about the mandrel and including a transmitter for transmitting electromagnetic energy into the formation, and a sleeve positioned about the antenna array. The apparatus further includes a first set of electrodes and a second set of electrodes. Each electrode has an outer end that is exposed on the outer surface of the sleeve for conductive contact with an adjacent conductive borehole environment. Further, the first and second sets of electrodes are spaced longitudinally apart such that the transmitter is positioned longitudinally therebetween. Electrodes of the first and second sets are conductively interconnected with the mandrel such that when the well logging apparatus is operated in a borehole environment having borehole currents therein, one or more current path loops are provided for shorting borehole currents.

8 Claims, 7 Drawing Sheets

U.S. PATENT DOCUMENTS

| | | |
|---|---|---|
| 6,566,881 B2 | 5/2003 | Omeragic et al. |
| 6,573,722 B2 | 6/2003 | Rosthal et al. |
| 6,584,408 B2 | 6/2003 | Omeragic |
| 6,667,620 B2 | 12/2003 | Homan et al. |
| 6,933,726 B2 * | 8/2005 | Chen et al. ............ 324/339 |
| 2003/0085707 A1 | 5/2003 | Minerbo et al. |
| 2005/0030038 A1 * | 2/2005 | Chen et al. ............ 324/343 |

FOREIGN PATENT DOCUMENTS

| | | |
|---|---|---|
| GB | 2388664 | 11/2003 |
| GB | 2393255 | 3/2004 |
| GB | 2404742 | 2/2005 |

* cited by examiner

APPARATUS AND METHOD FOR ADDRESSING BOREHOLE ECCENTRICITY EFFECTS

BACKGROUND OF INVENTION

1. Field of Invention

The present invention relates generally to an apparatus, and method for conducting measurements in or via a subsurface borehole. More particularly, the invention relates to such an apparatus and method for addressing certain "borehole eccentricity effects" encountered in such subsurface measurements, and more specifically, to reducing and/or correcting these borehole effects.

2. Background Art

Various resistivity logging techniques are employed in hydrocarbon exploration and production operations, including galvanic techniques (e.g., laterologs) and electromagnetic (EM) induction techniques. Both of these techniques employ logging instruments or "sondes" to emit energy (current or EM field) into the formation or environment surrounding a subsurface borehole. The emitted energy interacts with the formation to produce response signals that are detected by sensors on the instrument. The detected signals are then processed to establish a profile of one or more properties of the formation.

To ensure high quality measurements, the well logging tool is preferably maintained at or near the center of the borehole (i.e., along the longitudinal axis). It can be difficult, however, to maintain centering of the tool at all times. As the tool deviates from the center of the borehole toward the borehole wall, an otherwise accurate or desirable response signal may change (although the characteristics of the formation being measured has not). This change in the signal is referred to as the "standoff effect" or "eccentering effect" (hereforth, "borehole eccentricity effects"). An eccentered induction tool can, for example, induce very strong borehole-produced signals that interfere with the response signals from the formation.

The extent of the signal change due to the borehole eccentricity effect varies depending on the type of tool conducting the measurement. In the case of a resistivity tool, the signal may be influenced by changes in the location of the tool in the borehole and the resistivity of the drilling mud. The present invention relates generally to an apparatus and method for addressing any of these undesirable effects, particularly those arising from borehole currents, and to all types of resistivity logging, including electromagnetic (EM) induction logging.

Conventional wireline EM logging instruments are implemented with antennas that function as sources and/or sensors. On wireline EM logging instruments, the antennas are typically enclosed by a housing constructed of a tough plastic (insulating) material, e.g., a laminated fiberglass material impregnated with epoxy resin. Alternatively, these instruments may be constructed of thermoplastic (insulating) materials. The thermoplastic material of these instruments provides a non-conductive structure for mounting the antennas. U.S. Pat. No. 6,084,052 (assigned to the present assignee) discloses a composite-based logging instrument for use in wireline and LWD applications, as contemplated by the present invention.

The antennas are typically spaced apart from each other along the axis of the tool. These antennas are generally coils of the solenoid type comprising one or more turns of insulated conductor wire wound around a support. U.S. Pat. Nos. 4,651, 101, 4,873,488, and 5,235,285 (each assigned to the present assignee), for example, disclose instruments equipped with antennas disposed along a central metallic support (each hereby incorporated by reference and made a part of the present disclosure). In operation, the transmitter antenna is energized by an alternating current to emit EM energy through the borehole fluid (also referred to as mud) and into the formation. The signals detected at the receiver antenna are usually expressed as a complex number (phasor voltage) and reflect interactions of the emitted energy with the mud and the formation.

A coil (or antenna) carrying a current can be represented as a magnetic dipole having a magnetic moment proportional to the current and the area. The direction and magnitude of the magnetic moment is represented by a vector perpendicular to the plane of the coil. In conventional induction and propagation logging instruments, the transmitter and receiver antennas are mounted with their magnetic dipoles aligned with the longitudinal axis of the instruments. Such instruments are, therefore, referred to as having longitudinal magnetic dipoles (LMD). When an LMD tool is placed in a borehole and energized to transmit EM energy, the induced eddy currents flow in loops around the antenna in the borehole and in the surrounding formation. These eddy currents flow on planes that are perpendicular to the tool's longitudinal axis (which corresponds with the borehole axis) but do not flow up or down the borehole.

An emerging technique in the field of EM induction well logging is the use of instruments incorporating antennas that have tilted or transverse antennas. The magnetic dipoles of these antennas are tilted relative to or perpendicular to the tool axis. Such instruments are referred to as having transverse or tilted magnetic dipoles (TMD). These TMD instruments can, therefore, induce eddy currents that flow on planes that are not perpendicular to the borehole axis. As a result, these TMD tools provide measurements that are sensitive to dipping planes, formation fractures, or formation anisotropy. Logging instruments equipped with TMDs are described, for example, in U.S. Pat. Nos. 4,319,191, 5,508,616, 5,757,191, 5,781,436, 6,044,325, and 6,147,496 (each of which is hereby incorporated by reference and made a part of the present disclosure).

While TMD tools are capable of providing improved formation resistivity measurements, these tools tend to be significantly influenced by borehole currents. This is particularly true in high contrast situations, wherein the mud in the borehole is more conductive than the formation. When a TMD tool is energized at the center of the borehole, it can induce eddy currents that flow up and down the borehole. However, due to the symmetry in current flow, the up and down currents cancel each other, thereby providing zero net current flow in the axial or longitudinal direction. When a TMD tool is eccentered, however, there may not be any such symmetry in the current flow. If the TMD tool is eccentered in a direction parallel to the direction of the magnetic dipole of its antenna (i.e., longitudinal eccentricity) the symmetry plane that includes the borehole axis and direction of dipole moment is maintained and thus there is zero net current flow along the longitudinal or borehole axis. However, if a TMD is eccentered in a direction perpendicular to the direction of the magnetic dipole of its antenna (called transverse eccentricity), there is no such symmetry. Accordingly, there is a resultant current flow up or down the borehole, (when the antenna is energized). In high contrast situations (i.e., conductive mud and resistive formation), the borehole currents can flow a long distance along the borehole. When these currents pass in the vicinity of TMD receivers, they induce undesired signals that can be much larger than the actual response signals from the formation.

Some of these undesirable effects (signals) may be attenuated during data processing. For example, U.S. Pat. No.

5,041,975 (assigned to the present assignee) discloses a technique for processing data from downhole measurements to correct for borehole effects. U.S. Pat. No. 6,541,979 (assigned to the present assignee) discloses techniques for reducing the effect of borehole eccentricity, using mathematical corrections for the borehole currents effects.

Alternatively, the undesirable effects from borehole currents may be minimized during data acquisition. For example, U.S. Pat. No. 6,573,722 (assigned to the present assignee) discloses methods to minimize the borehole currents passing TMD antennas. In one method, an electrode located below the TMD antenna is connected to another electrode located above the TMD antenna to provide a conductive path beneath the TMD antenna. This additional conductive path reduces the amount of borehole currents passing in front of the TMD antenna, and thus minimizes the undesirable effects. In another method, a tool is disclosed that generates a localized current in the borehole (between the two electrodes located on either side of a TMD antenna) that counteracts or cancels out the undesirable borehole currents. However, the localized current itself has an adverse effect on the TMD antenna, albeit to a lesser extent than the borehole currents.

While these prior art methods and tools provide means to reduce the effects of borehole currents, there remains a need for further improvements in the development of systems, methods, and apparatus to reduce, eliminate, or otherwise address the undesired effects of borehole currents.

SUMMARY OF INVENTION

In one aspect of the invention, a well logging apparatus is provided for conducting measurements in a borehole environment surrounding a borehole that traverses a subsurface formation. The inventive apparatus includes an elongated conductive mandrel having a longitudinal axis, an antenna array positioned about the mandrel and including a transmitter for transmitting electromagnetic energy into the formation, and a sleeve positioned about the antenna array. The sleeve has an outer surface positioned for exposure to the borehole environment and an inner surface positioned radially inward of the outer surface into the formation. The apparatus further includes a first electrode (preferably a plurality) and a second electrode (preferably a plurality) each having an outer end and an inner end positioned radially inward of the outer end. Both electrodes are supported on the sleeve such that the outer end is exposed on the outer surface of the sleeve for conductive contact with the adjacent conductive borehole environment. Further, the first and second electrodes are spaced longitudinally apart such that the transmitter is positioned longitudinally therebetween. Importantly, the first and second electrodes are conductively interconnected with the mandrel such that when the well logging apparatus is operated in a borehole environment having borehole currents therein, one or more current path loops are provided for shorting borehole currents. The current path loops include a first conductive path between the conductive borehole environment, the first electrode and the mandrel and a second conductive path between the conductive borehole environment, the second electrode and the mandrel. Accordingly, operation of the inventive well logging apparatus alleviates the problem presented by borehole current effects by shorting the currents in the manner described above, thereby reducing such effects to a manageable level.

Preferably, each electrode is a component that is separate from, and movable relative to, said mandrel. More preferably, the apparatus includes a first conductive connection and a second conductive connection, each disposed between one of the electrodes and the mandrel to conductively interconnect the electrode with the mandrel. Each conductive connection is a component separate from said electrode and said mandrel.

In one preferred embodiment, a first set of electrodes is supported on the sleeve above the transmitter and azimuthally spaced apart about the sleeve. The electrodes of this first set, which includes the first electrode, are conductively interconnected with the mandrel. Also, a second set of electrodes is positioned below the transmitter and azimuthally spaced apart about the sleeve. The electrodes of this second set, which includes the second electrode, are also conductively interconnected with the mandrel. Moreover, each of the electrodes of the first and second sets has an outer end and an inner end positioned radially inward of the outer end, and is supported on the sleeve such that the outer end is exposed for conductive contact with the adjacent conductive borehole environment. In this way, a current path loop (preferably, in addition to other current path loops) extends between the conductive borehole environment, the first set of electrodes, the mandrel, the second set of electrodes, and the conductive borehole environment.

In another aspect of the present invention, a sleeve assembly is provided for a well logging apparatus that includes an elongated conductive mandrel and a triaxial antenna array positioned about the mandrel. The sleeve assembly includes a non-conductive sleeve that is positioned about the antenna array and which has an outer surface positioned for exposure to the borehole environment and an inner surface positioned radially inward of the outer surface. The sleeve assembly further includes a first set of electrodes supported on the sleeve above the transmitter and azimuthally spaced apart about the sleeve. The electrodes of this first set are conductively interconnected with the mandrel. A second set of electrodes is positioned below the transmitter and azimuthally spaced apart about the sleeve. The electrodes of this second set are also conductively interconnected with the mandrel. Moreover, each of the electrodes of the first and second sets has an outer end and an inner end positioned radially inward of the outer end, wherein the outer end is exposed on the outer surface of the sleeve for conductive contact with an adjacent conductive borehole environment. In this way, when the well logging apparatus is operated in a borehole environment having borehole currents therein, current path loops are provided for shorting borehole currents. These current path loops include current path loops between the conductive borehole environment, the first set of electrodes, the mandrel, the second set of electrodes, and the conductive borehole environment.

In yet another aspect of the invention, a method is provided for reducing borehole current effects on measurements conducted with a well logging apparatus in the conductive borehole environment, wherein borehole currents are generated in the borehole environment adjacent the well logging apparatus. The inventive method includes providing a well logging apparatus having an elongated conductive mandrel with a longitudinal axis, an antenna array positioned about the mandrel and including a transmitter for transmitting electromagnetic energy and a receiver for receiving a response signal from the formation, and a sleeve positioned about the antenna array. The sleeve has an outer surface positioned for exposure to the borehole environment and an inner surface positioned radially inward of the outer surface. The method further entails supporting an upper set of electrodes in the sleeve at a position longitudinally above the transmitter and a lower set of electrodes in the sleeve at a position longitudinally below the transmitter, whereby electrodes of the first and second sets radially extends between the outer surface of the sleeve and the inner surface. In this way, the upper set of electrodes and the lower set of electrodes are conductively interconnected through the mandrel.

The method then requires positioning the well logging apparatus in the borehole such that the outer surfaces of the electrodes are exposed to the conductive borehole environment and operating the well logging apparatus to transmit electromagnetic energy into the formation, whereby borehole currents are generated in the conductive borehole environment. Borehole currents are then directed into current path loops between electrodes of the first set of electrodes, the mandrel, electrodes of the second set of electrodes, and the conductive borehole environment thereby shorting the borehole currents and reducing the borehole current effects on the receiver. In some applications, the step of positioning the well logging apparatus includes positioning the well logging apparatus such that the transmitter has a transversely eccentered dipole. Preferably, the step of directing borehole currents includes directing the borehole currents from the conductive borehole environment radially through the electrodes and to the mandrel.

BRIEF DESCRIPTION OF DRAWINGS

FIG. 7a is a circumferential plan view of the insulating sleeve of FIG. 7a; and

DETAILED DESCRIPTION

Figure 1A:
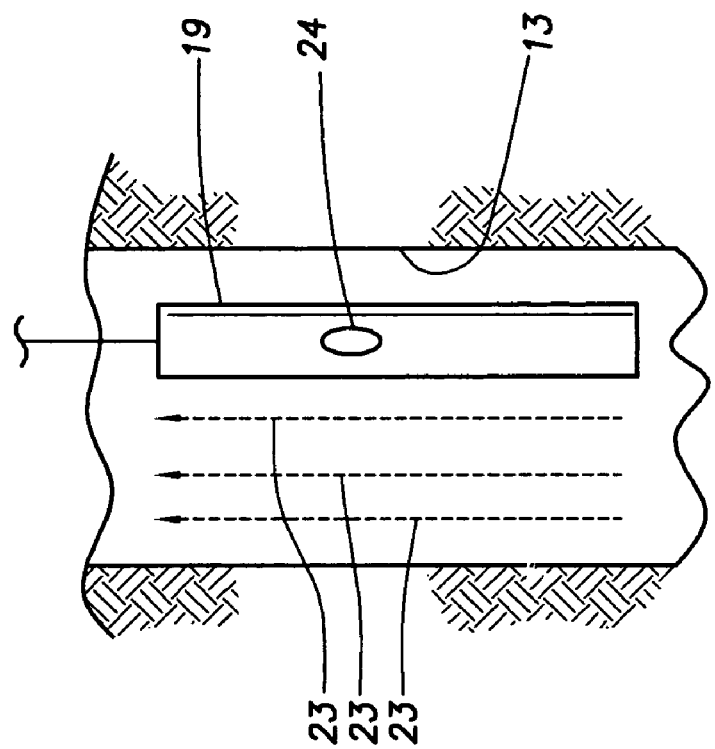
FIG. 1a is a schematic illustrating borehole currents caused by operation of a transversely eccentered TMD antenna in a borehole.
Figure 1:
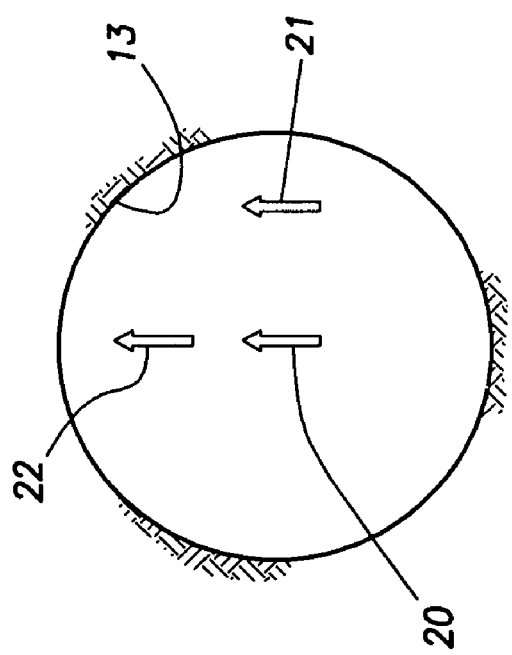
FIG. 1 is a simplified diagram illustrating eccentering of a TMD antenna on a logging tool disposed within a borehole.

FIGS. 1 and 1a are used herein to describe briefly the problem presented by borehole induced currents to a well logging tool operation. FIGS. 2-7 depict exemplary systems, apparatus, and methods for addressing this problem, in accordance with the present invention. For purposes of description, the following Detailed Description focuses primarily on an electromagnetic (EM) induction logging operation to describe the inventive systems, apparatus, and method(s) of reducing the induced borehole currents.

As noted above, the presence of borehole induced currents caused by tool eccentering can compromise the quality of well logging measurements. Referring to FIG. 1, a transverse or tilted magnetic dipole (TMD) 20 that is normally positioned at the center of the borehole 13 may be eccentered in two possible orientations. These two orientations are referred to as longitudinal eccentering (parallel to the direction of the magnetic dipole of the antenna) and transverse eccentering, represented by dipole 22 and dipole 21, respectively. A longitudinal eccentered dipole 22 produces eddy currents in the borehole 13. However, because the eddy currents are symmetric about the plane of the borehole 13 and the dipole movement, no net current flows are created up or down the borehole 13. Thus, a tool with a longitudinally eccentered dipole 22 does not generate undesirable borehole effects. In contrast, a tool that has a transverse eccentered dipole 21 induces eddy currents to flow up and down the borehole 13, but without the symmetry to cancel out the up and down currents. As a result, a transversely eccentered dipole 21 gives rise to significant borehole currents. FIG. 1a illustrates such a well logging tool 19 having a transversely eccentered dipole operating in a borehole 13 and generating borehole currents 23. These borehole currents 23 deliver a strong signal to a receiver 24 that is disposed on a well logging tool 10, thereby compromising the quality of the measurement.

Figure 2:
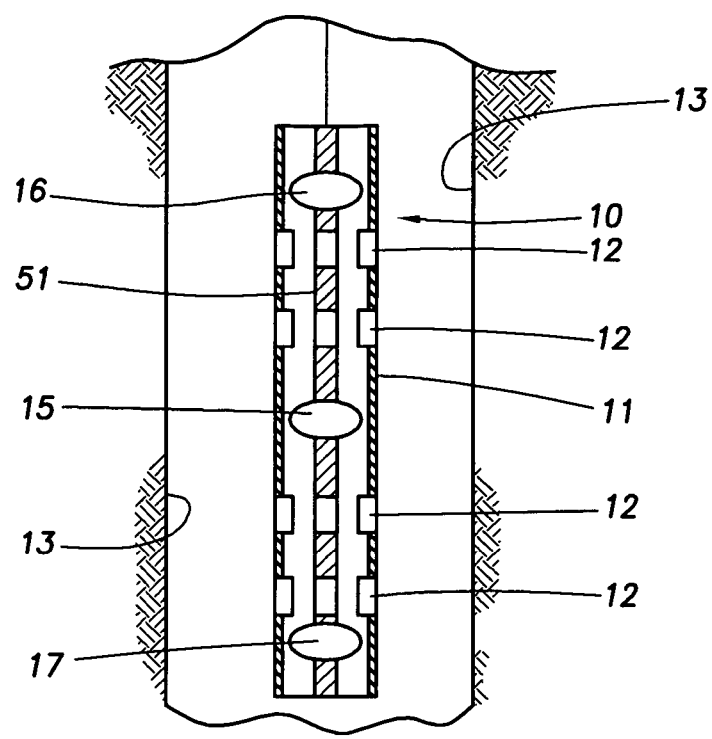
FIG. 2 is a schematic of a logging tool disposed within a borehole and incorporating various electrodes in accordance with the present invention.
Figure 2A:
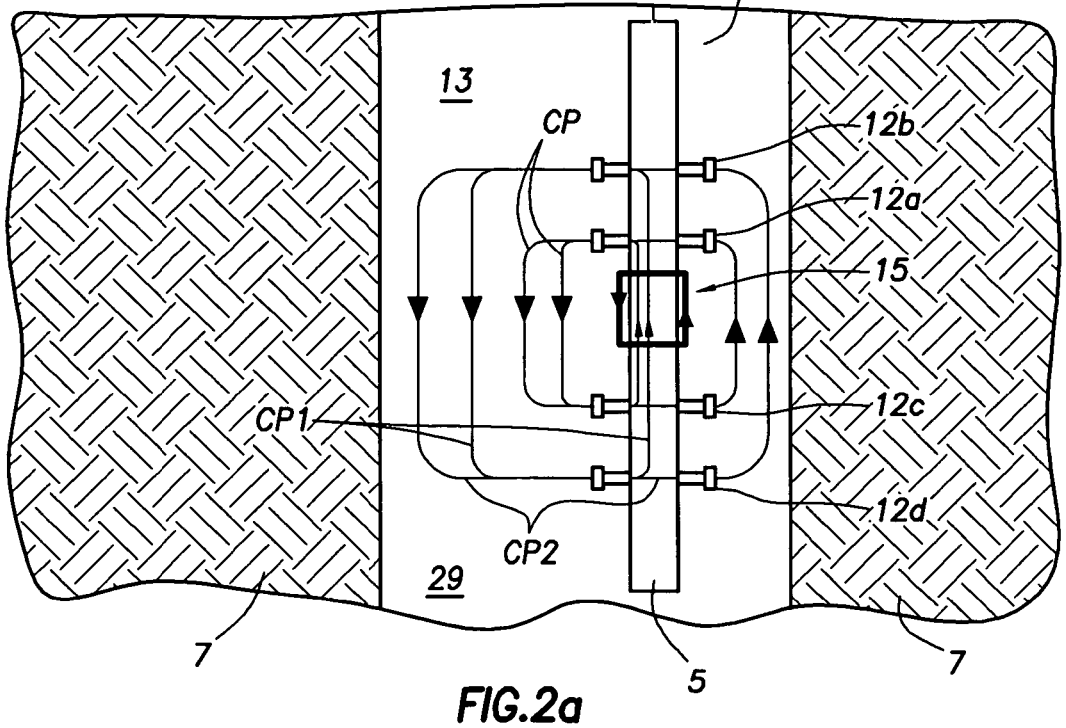
FIG. 2a is a schematic illustrating borehole current paths arising from operation of a perpendicularly or transversely eccentered well logging tool in a borehole, according to the present invention.

In one aspect of present invention, the apparatus and method provides a simple and cost-effective solution to the above-mentioned problem presented by borehole currents. More particularly, the inventive system, apparatus and method are employed to address the borehole currents by providing preferably radial conductive paths that route borehole currents through an inner mandrel of the tool, thereby reducing or eliminating the borehole currents passing by and influencing the receiver antenna. FIG. 2 illustrates, in a simplified schematic, a well logging tool 10 and system for addressing such borehole currents. FIG. 2a illustrates the borehole current patterns resulting from the use of the inventive well logging tool 10.

Referring to the schematic of FIG. 2, a well logging tool 10 according to one embodiment of the present invention, has a plurality of antenna arrays each disposed around a conductive mandrel 51 and spaced apart from one another thereon at different longitudinal or axial positions. In this embodiment, the antenna array includes a transmitter 15, an upper receiver 16 positioned above the transmitter 15, and a lower receiver 17 positioned below the transmitter 15. In another preferred embodiment, the receivers (two or more) are located and spaced apart below (or above) the transmitter. The transmitter 15 and the receivers 16, 17 may be LMDs, TMDs, or a combination thereof. The transmitter 15 and receivers 16, 17 are typically disposed on nonconductive support members (not shown in FIG. 2), which are disposed about the conductive mandrel 51. The non-conductive support member provides, therefore, a buffer between the conductive mandrel 51 and the antennas 15, 16, 17. The antennas 15, 16, 17 may be solenoid-type coil antennas, loop antennas, or any coil construction resulting in a transverse magnetic dipole.

The antennas 15, 16, 17 are disposed radially inward and thus, inside of, and thereby protected by, an insulating sleeve 11 that provides the substantial outer surface of the tool 10. The sleeve 11 is sealingly attached to the rest of the tool 10, during the final stages of assembly, by sliding it over the assembly of antennas 15, 16, 17 and mandrel 51. It is noted then that the connection between electrodes 12 on the sleeve 11 and the inner mandrel 51 cannot be conveniently hard-wired (at least, initially) because the sleeve 11 is installed after and independently of, the mandrel 51 and antennas 15, 16, 17. The sleeve 11 may be made of any durable insulating material that is typically used in the industry, for example, a composite material, elastomer or rubber.

Figure 3:
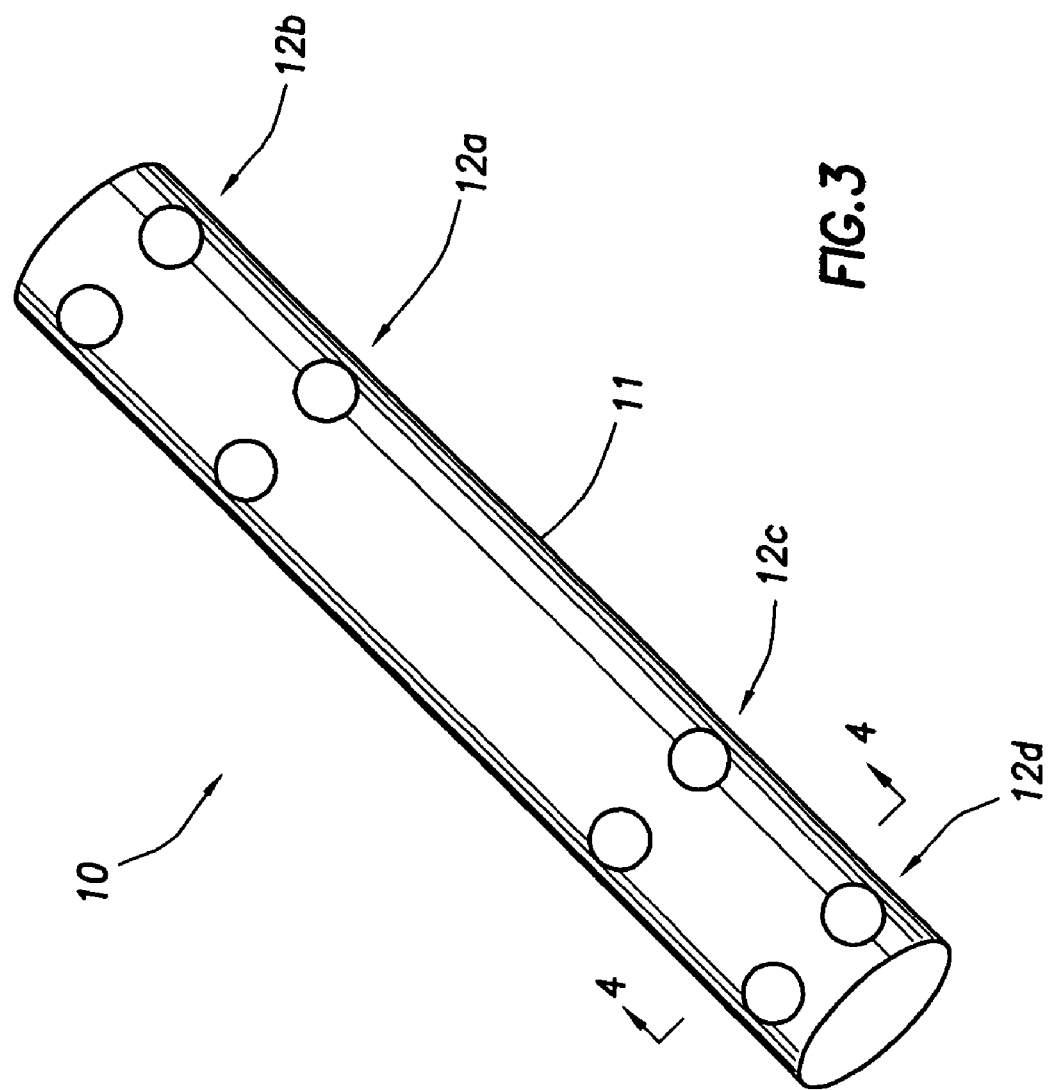
FIG. 3 is a perspective view of the well logging tool in FIG. 2.

Referring also to FIG. 3, a plurality of electrodes 12 are radially embedded in the sleeve 11 such that an outer surface portion of each electrode 12 is exposed on the outside surface of the sleeve 11 and thus, to the environment of the borehole 13 during operation. The transmitter 15 is positioned longitudinally so as to be bracketed above and below by electrodes 12. The electrodes 12 may be singular (e.g., button) electrodes as in FIGS. 2-7, or annular (encircling the sleeve), for example, banded or ring electrodes. In further embodiments described below, the electrodes 12 are slotted, metallic plates (see e.g., FIGS. 7). An embodiment that employs singular electrodes 12 may have multiple electrodes 12 or sets that are azimuthally positioned about the same longitudinal position along the tool axis, as illustrated in FIGS. 2 and 3). The electrodes 12 may be made of any durable conductive material that is typically used in the industry or that would be appreciated by one of ordinary skill in the art. In a preferred embodiment, the sleeve 11 and the electrodes 12 are both made of materials sufficiently durable to resist or limit erosion (or wear) caused by rubbing against the borehole wall 14 or corrosion caused by the caustic nature of the environment of the borehole 13.

Applicants recognize that the use of various materials for tool components may provide components with different rates of thermal expansion, and may result in undesirable stresses, cracking, fatigue, and failure upon or after prolonged exposure to high-temperature borehole environments. Certain embodiments of the invention address these conditions by utilizing components or configurations that accommodate the different thermal expansion rates of the tool components. Further embodiments of the invention provide a configuration that allow for the conductive connection between the electrodes to take place after the sleeve 11 is positioned over the antennas 15, 16, 17.

In the embodiments of FIGS. 2 and 3, the insulating sleeve 11 includes a plurality of azimuthally spaced apart "button" type electrodes 12 embedded in the surface sleeve 11 material. As described previously, the sets of button electrodes 12 are longitudinally or axially positioned so as to saddle the transmitter 15. In the illustrated preferred embodiment, there are two sets or groups 12a, 12b of button electrodes 12 positioned above the transmitter 15 and two sets or groups 12c, 12d of button electrodes 12 positioned below the transmitter 15. Each set or group 12a-12d include eight azimuthally spaced apart button type electrodes 12. It should be noted that in further embodiments of the invention, the number of electrodes may vary.

Figure 4:
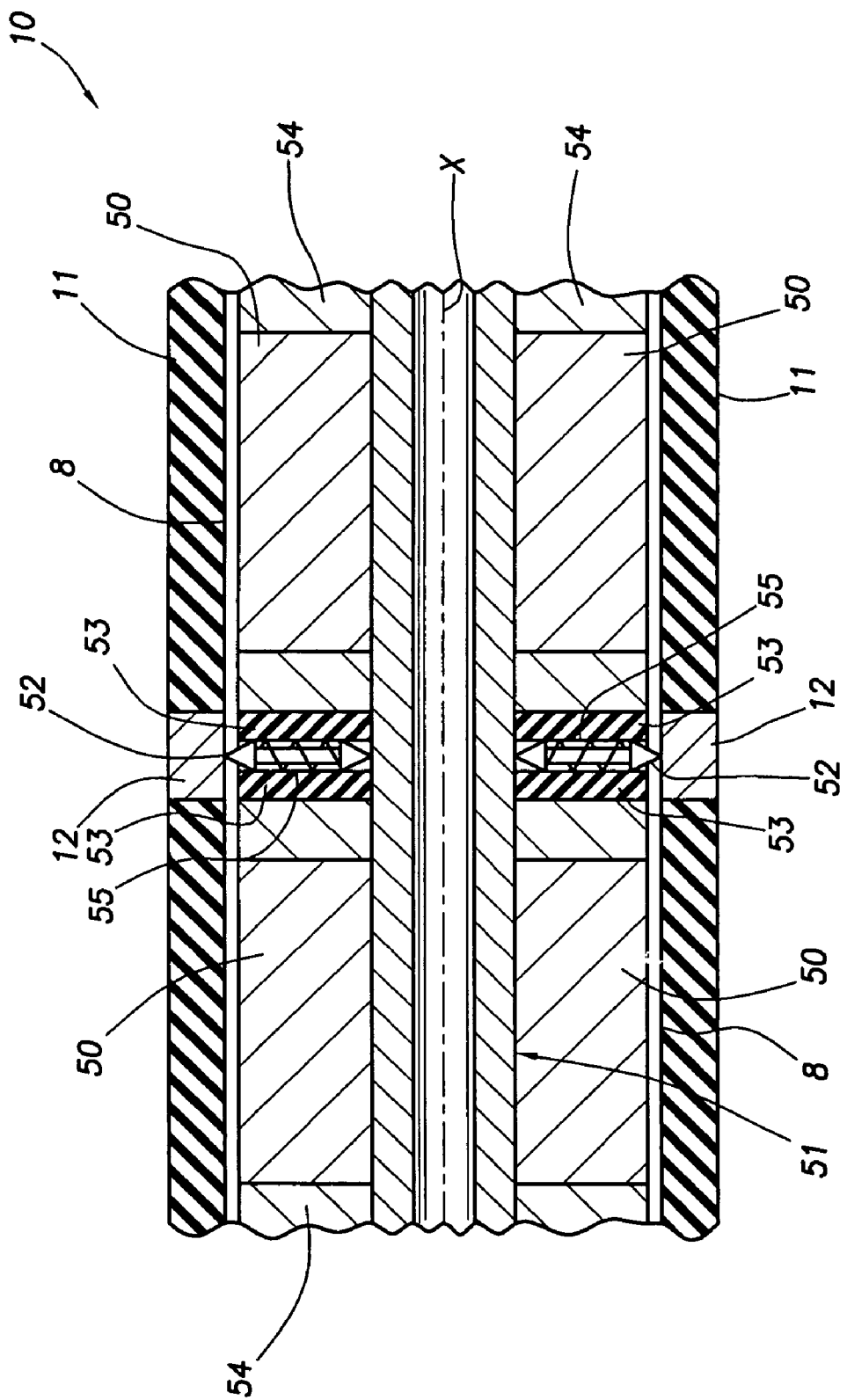
FIG. 4 is a longitudinal cross-sectional view of a portion of the well logging tool, including an insulating sleeve, according to the present invention.

The cross-sectional view of FIG. 4 depicts a portion of a fully assembled well logging tool 10, according to the present invention. The logging tool includes a centrally situated and longitudinally extending inner mandrel 51 (having a longitudinal axis generally parallel with the borehole axis). In the present invention, the inner mandrel 51 is a "conductive mandrel" that may take the form of a metal rod, and other suitable forms. As also shown in FIG. 4, an antenna is assembled and positioned about the inner mandrel 51. The typical antenna array includes spacer assemblies disposed between the antennas. The assembly consists of spacers 54, bobbins 50 positioned longitudinally within spacers 54, and contact spacers 53 positioned longitudinally within the bobbins 50. Each of these elements is assembled snugly about the mandrel 51 and radially inward and inside of sleeve 11. As shown in FIG. 4, the pair of contact spacers 53 form a radially extending channel 55 therebetween. Positioned within the channel 55 is a conductive assembly or conductive member 52 extending past the depth of the channel 55. As will become apparent with the description provided below, the conductive member 52 makes contact (i.e., electrical contact) with both the mandrel 51 and the electrode 12, thereby providing a radially directed current path therebetween. When the borehole environment, i.e., drilling mud, is also conductive, resulting in a conductive path between the borehole environment and the mandrel 51 is provided.

The insulating sleeve 11 is conveniently positioned about the antennas 15, 16, 17 and mandrel 51 such that the electrode 12 is longitudinally or axially aligned for contact with the conductive member 52. The primary function of the insulating sleeve 11 is to cover and protect the antenna array. As a minimum, the insulating sleeve 11 includes a non-conductive portion 11a and a hole or channel 8 that helps retain an electrode 12. With reference also to FIG. 3, the button electrodes 12 are embedded in the sleeve 11 such that an inner surface faces radially inward of the sleeve 11.

For purposes of the present invention, it should be noted that the conductive member 52 may take one of several suitable shapes. For example, in one application, the conductive member is an integral part of the contact spacer 53. In this embodiment, the interfaces between the electrode 12 and the conductive member 52 and between the conductive member 52 and the mandrel 51 are not hardwired. This is preferred because, as discussed above, the sleeve 11, the antenna array, and the conductive mandrel 51 may exhibit significantly different rates of thermal expansion when the tool 10 is exposed to elevated temperatures.

FIG. 2a illustrate the borehole current path loops CP generated (and diverted) during operation of the well logging tool 10 with a transversely eccentered dipole and in a borehole 13 having drilling mud 29 that is conductive with a surrounding formation 7. FIG. 2a illustrates, more specifically, the current path loops CP generated as a result of operating the inventive system for addressing the borehole currents. In contrast to the axially flowing borehole currents depicted in FIG. 1a, the borehole currents are shorted along looped current path loops CP around the transmitter 15, and away from the receivers 16, 17. In this way, the borehole currents effect on the receivers are manageable.

As discussed previously, the sets 12a-12d of button electrodes 12 saddle or bracket the transmitter 15. The sets 12a-12d of electrodes 12 are conductively connected to each other through the conductive mud, the conductive member 52, and the mandrel 51. The current path CP1, CP2 is shorted within the local area around the transmitter antenna 15 (when button electrodes 12 of sets 12b, 12c are exposed to the borehole mud), thereby significantly attenuating the up and down current flow which would otherwise be present.

It should be noted that current paths CP can be categorized in two ways. In a first current path CP1, the borehole is directed through the following loop: conductive mud 29—button electrode 12—conductive member 52—mandrel 51—conductive member 52—button electrode 12—conductive mud 29. In this current path CP1, the directed current flows through the mandrel 51 and beneath the transmitter 15. In the second current path CP2, the borehole current is directed through the following loop: conductive mud 29—button electrode 12—conductive member 52—mandrel 51—conductive member 52—button electrode 12—conductive mud 29—button electrode 12—conductive member 52—mandrel 51—conductive member 52—button electrode 12—conductive mud 29. Both current paths CP1, CP2 describe a closed current loop. Both current path loops CP1, CP2 include at least two radially directed conductive paths (i.e., a portion of the path loop) between the conductive mud 29, an electrode, and the mandrel 51. Thus, with the aid of conductive electrodes 12 and conductive contacts 52, the current paths are restricted within the local area around the transmitter antenna 15. In this manner, the borehole current effect on the receivers 16, 17 is greatly reduced or eliminated.

It should be noted that the inventive system and method also operates to minimize the influence of shoulder-bed effects on the response signal. The same methodology described above applies in the same manner to localize undesirable currents excited by the transmitter.

Figure 5:
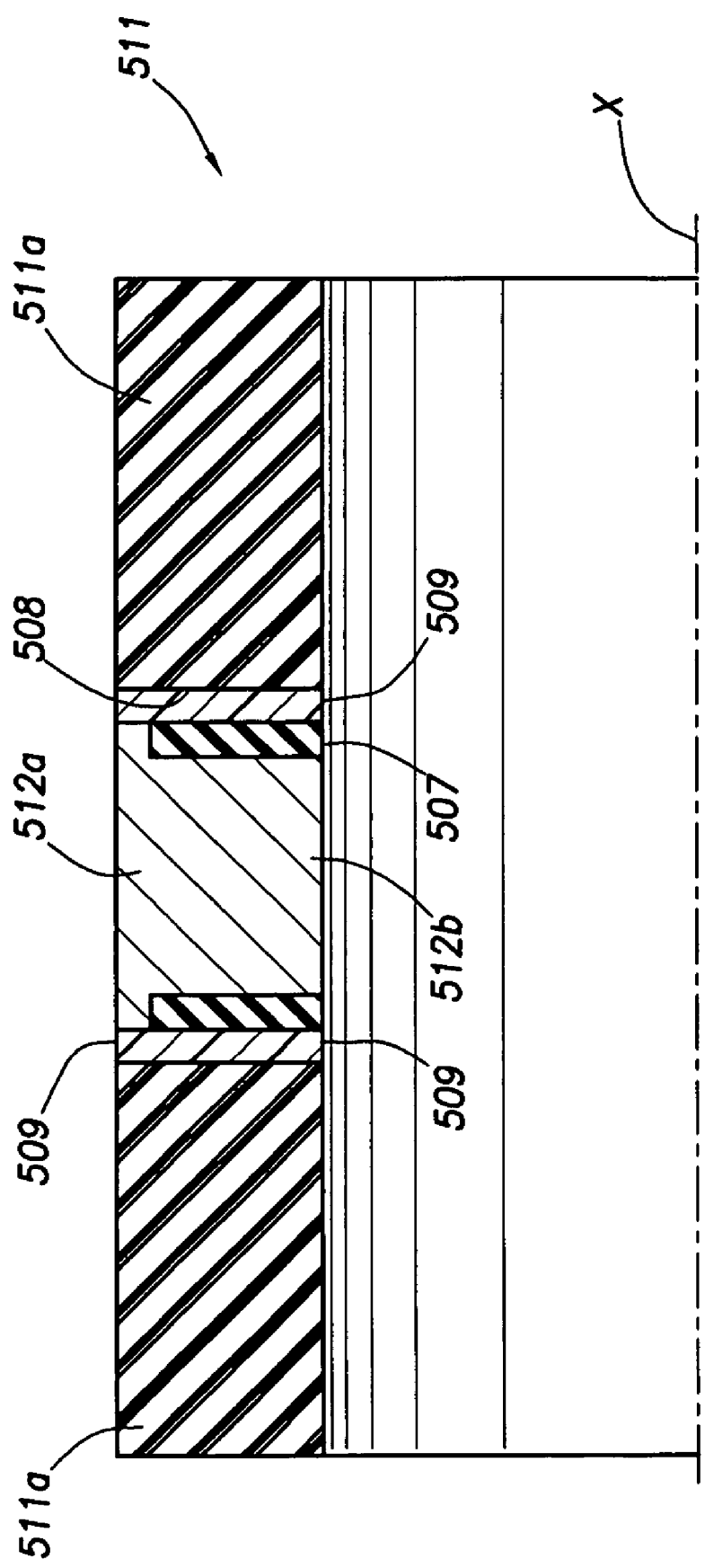
FIG. 5 is a partial cross-sectional view of an alternative insulating sleeve according to the present invention.

Referring now to FIG. 5, in an alternative embodiment of the present invention, an insulating sleeve 511 includes or retains a cylindrical button electrode 512 with a T-shaped cross section. The insulating sleeve material 511a of the sleeve 511 includes a channel or hole 508 drilled therein and in which button electrodes 512 are situated. The button electrode 512 has a top or external section 512a that is larger than a radially inwardly extending base section 512b. As shown in FIG. 5, rubber sleeves 507 are wrapped about the base section 512b of the electrode 512, and then the interface between the electrodes 512 and the rubber sleeve 507 is sealed by glue. Alternatively, the seal may be formed by molding the rubber material directly onto the side of the cylindrical button electrode 512. Preferably, epoxy material 509 is placed between the electrode 512 and the rubber sleeve 507 and the insulating sleeve material 511a.

By providing rubber sleeve 507 between the metallic electrode 512 and the composite sleeve 511 (and epoxy material 508), flexibility is imparted to the entire ("dynamic") assembly. Accordingly, the different rates of thermal expansion of the elements are accommodated. Among other things, this also guards against the creation of microcracks which may form after several thermal expansion cycles and serve as potential leak paths.

Figure 6:
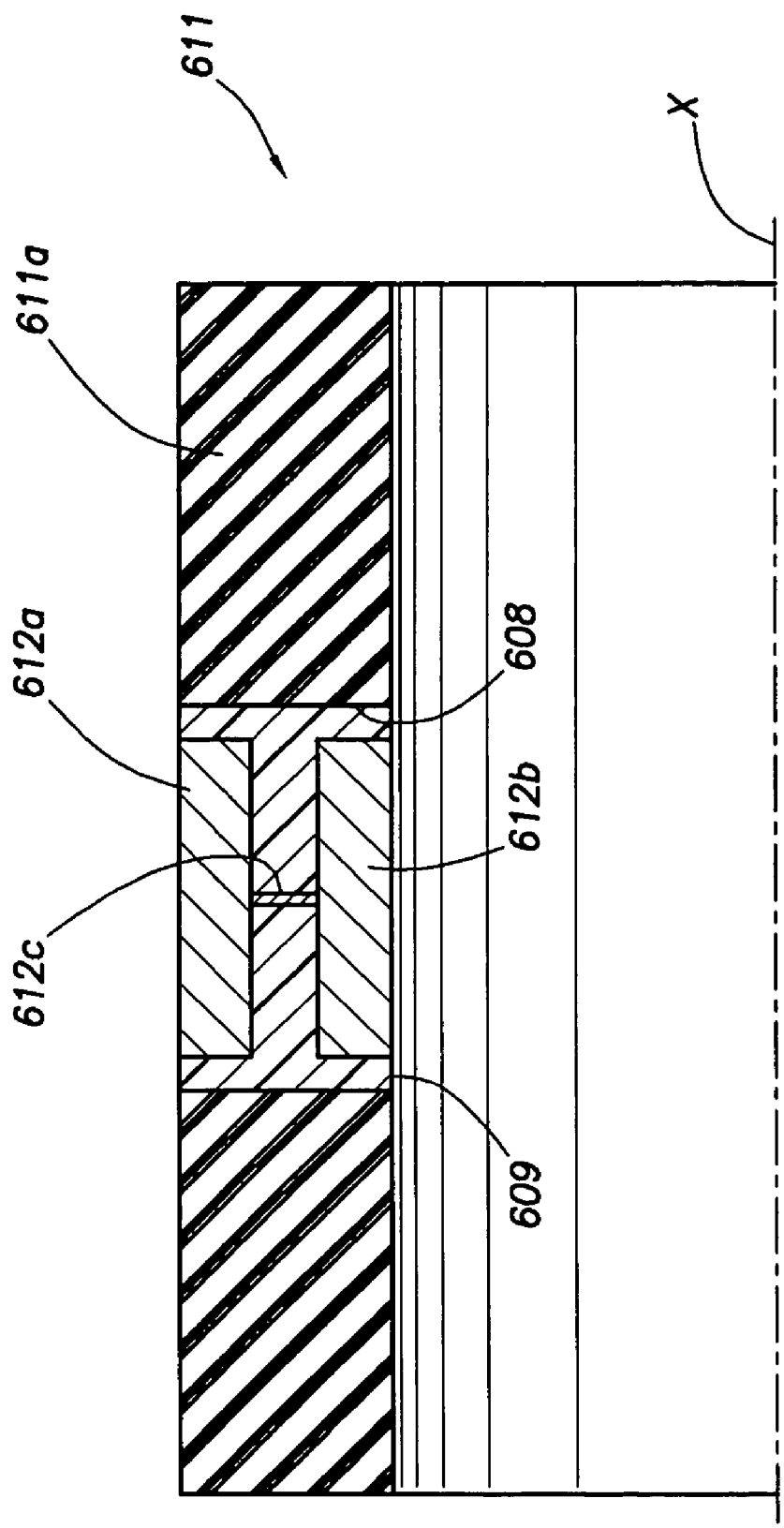
FIG. 6 is a partial cross-sectional view of an insulating sleeve according to another alternative embodiment of the present invention.

The cross-sectional view of FIG. 6 depicts yet another embodiment of the inventive insulating sleeve according to the present invention. The insulating sleeve 611 includes a non-conductive, insulating material 611a into which multiple holes or channels 608 are drilled and multiple button-type metallic electrodes 612 are embedded. In this particular embodiment, the metallic button electrode 612 has three different, major components: an outer metallic button 612a, an inner metallic button 612b that is substantially similar to the outer metallic button 612a, and a metallic conductor element 612c disposed therebetween. The metallic conductor element 612c provides electrical contact between the outer and inner metallic buttons 612a, 612b. As shown in FIG. 6, the conductor element 612c has a substantially smaller diameter than the outer and inner metallic buttons 612a, 612c. When the holes 608 are drilled in the insulating material 611a (to accommodate the electrode 612), the additional space or void is filled with epoxy material 609. The epoxy material 609 also fills the gap or space between the outer and inner metallic electrodes 612a, 612b.

The conductor element 612c is preferably a wire or other very thin metallic rod. Because the conductor element 612c has such a small diameter relative to the hole or space between the insulating material 611a, any thermal expansion effect in the radial direction of the conductor element 612c is insignificant. Accordingly, the potential for leakage is substantially reduced.

The terms "insulating sleeve" and "composite sleeve" are used herein to refer to the insulating sleeve itself and components supported therein such as the electrode 12. The term "sleeve assembly" may also be used to refer to the combination of the sleeve and the electrodes.

Figure 7A:
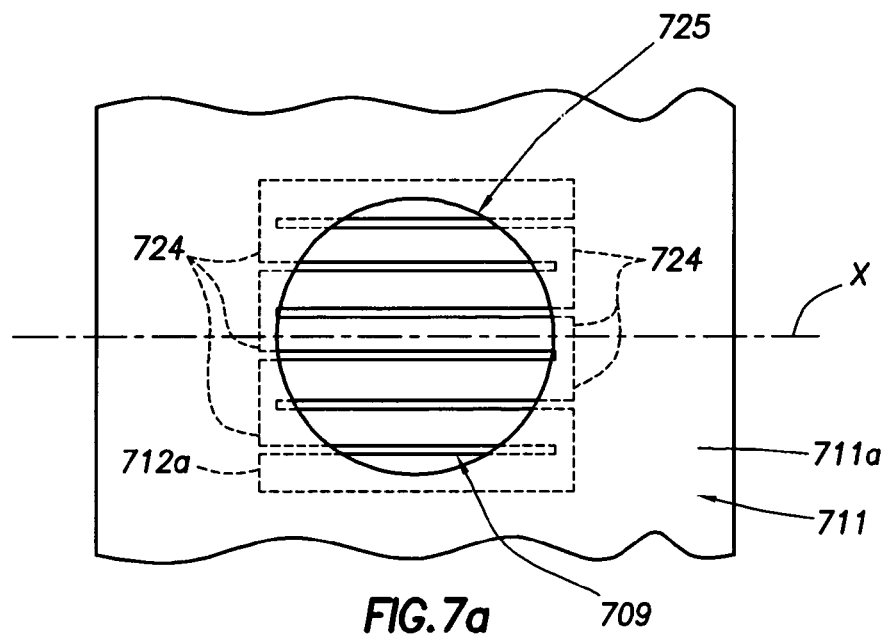
Figure 7:
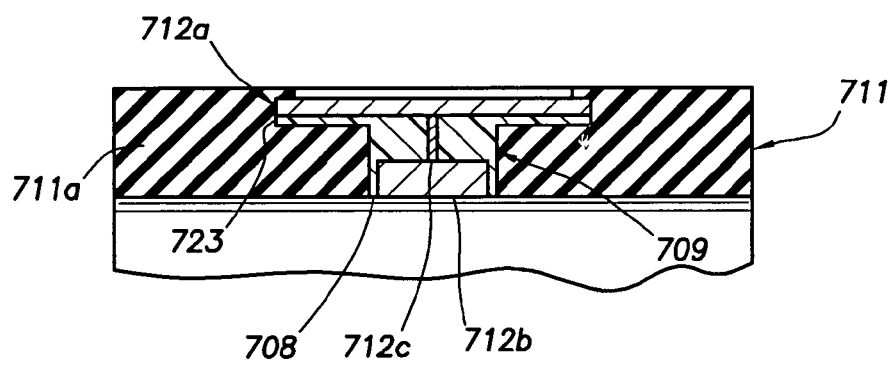
FIG. 7 is a partial cross-sectional view of an insulating sleeve according to another alternative embodiment of the present invention.

FIG. 7 depicts a variation of the insulating sleeve embodiment that supports a multi-component electrode, according to the present invention. In some applications, it is desirable to increase the exposed surface area of the electrode in order to obtain a certain formation response signal. The embodiment of FIG. 7 provides an electrode 712 having such an enlarged exposed surface. As shown in the partial side view of FIG. 7, an insulating sleeve 711 includes a non-conductive sleeve material 711a having a channel or hole 708 drilled therein and into which one or more metallic button electrodes 712 are embedded.

The multi component electrode 712 includes an outer metallic button 712a, an inner metallic button 712b, and a conductor element 712c positioned therebetween. The inner metallic button 712b has a disc shape with an inside surface that is connected to conductor element 712c. The conductor element 712c has a substantially reduced diameter, giving it more of a rod-like shape.

Further, the insulating sleeve 711 includes an outer metallic button 712a that is substantially larger in respect to its side view dimensions than the inner metallic button 712c. In FIG. 7, the outer metallic button 712a has a rectangular or square shape. The channel or hole 708 includes a circular surface opening 725 and an enlarged recess 723 provided directly beneath the opening 725. The rectangular button electrode 712a fits conveniently and securely within the recess 723. With reference also to FIG. 7a, the rectangular button electrode 712a (see dash outline) has a top metallic surface area that is greater than the area within the opening 725 (i.e., the recess area). Thus, only a central portion of the button electrode 712a is exposed to the borehole environment. Moreover, the button electrode 712 is advantageously embedded below or inward of the surface of the insulating sleeve 711 and thus, less likely to be damaged by contact with elements in the borehole environment.

Figure 7B:
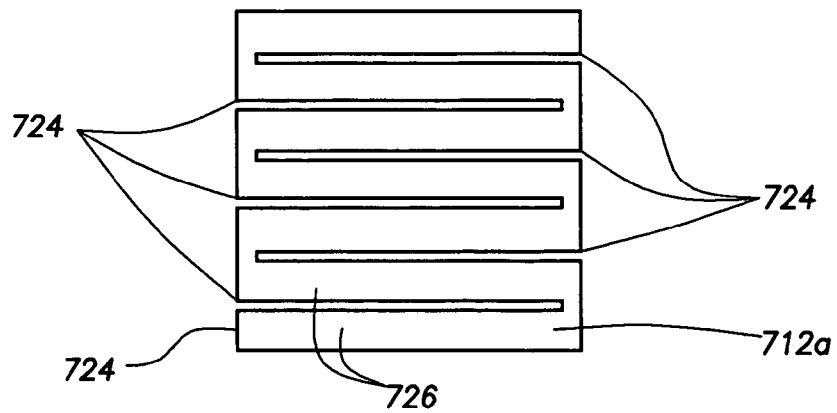
FIG. 7b is a plan view of a slotted metallic plate for use with the insulating sleeve of FIG. 7.

As shown in FIG. 7b, the button electrode 712a has a rectangular periphery, and a plurality of longitudinally extending slots 724 provided thereacross. The slots 724 divide the exposed metallic surface of the electrode 712a, into multiple, interconnected finger electrodes 726 that are aligned in generally parallel relation. In this embodiment, the total exposed metallic surface of the electrode 712a is advantageously increased (e.g., from previously described embodiments), thereby making it easier for the borehole current to be directed to the electrodes. Normally, increasing the size of the exposed metallic surface provides "circular" areas that are conducive to formation of eddy current loops that can couple back to the receiver. In the present invention, the slots 724 alleviate this potential problem by dissecting the large single metallic surface into a surface having multiple, connected sections that are generally narrow and absent of a large "circular" area in which a large eddy current loop may generate.

It should be noted that, in further embodiments, other configurations and geometries of the button electrode may be employed to achieve the same general objectives, or different specific objectives. For example, the slots 724 in FIGS. 7a and 7b are shown in oriented in generally parallel relation along the longitudinal direction and in parallel with the longitudinal axis of the tool. In other embodiments, the slots may be oriented in parallel relation along the lateral or circumferential direction (perpendicular to the longitudinal axis of the tool).

Also, the opening 725 may take on a different geometry, (e.g., a square). In each of these applications, the opening 725 and the recess 723 provide an advantageously secure fit for the metallic plate of the button electrode 712a. The button electrode 712a is well protected by the sleeve material 711a, thereby rendering more rigidity and stability to the overall assembly. Accordingly, the button electrode 712a and the other components of the electrode 712 are less likely to be damaged (e.g., extracted) by obstacles in the environment. Preferably, the gaps between the electrode component 712a, 712b, 712c and the composite insulating material 711a will be filled with or by epoxy 709.

The foregoing description of the present invention has been presented for purposes of illustration. It is to be noted that the description is not intended to limit the invention to the various apparatus, systems, and methods disclosed herein. Various aspects of the invention as described above, may be applicable to other types of well logging or measurement tools, for examples, or different arrangements for an induction or resistivity type tool. Such variations of the invention will become apparent to one provided with the present disclosure and skilled in the petroleum, geological, petrophysical, or other relevant art. Consequently, variations and modifications commensurate with the above teachings, and the skill and knowledge of the relevant art, are within the scope of the present invention. The embodiments described and illustrated herein are further intended to explain the best modes for practicing the invention, and to enable others skilled in the art to utilize the invention and other embodiments and with various modifications required by the particular applications.

The invention claimed is:

1. A sleeve assembly for a well logging tool of the type having a conductive mandrel and an antenna array disposed around the mandrel, the sleeve assembly comprising:

a one-niece sleeve having an outer surface and an inner surface, and a sleeve hole extending from the outer surface to the inner surface, the sleeve adapted to be disposed over the antenna array such that the outer surface is directed outward from the mandrel; and an electrode disposed within the sleeve hole and extending radially inward from the outer surface of the sleeve hole and terminating proximate the inner surface of the sleeve hole and adapted to conductively connect to the mandrel, the electrode having an external section that is larger than a base section, the external section positioned proximate the outer surface and the base section disposed within the sleeve hole proximate the inner surface.

2. The sleeve assembly of claim 1, further including a wrap disposed about the base section.

3. The sleeve assembly of claim 2, further including a filler positioned between the sleeve and the electrode and the wrap.

4. The sleeve assembly of claim 3, wherein the hole is formed through a non-conductive material of the sleeve.

5. The sleeve assembly of claim 2, wherein the sleeve hole is formed through a non-conductive material of the sleeve.

6. The sleeve assembly of claim 1, further including a filler positioned between the electrode and the sleeve.

7. The sleeve assembly of claim 1, wherein the sleeve hole is formed through a non-conductive material of the sleeve.

8. The sleeve assembly of claim 1, wherein the external section includes an exposed outside surface area positioned relative to the sleeve and the hole for exposure to the borehole environment, and wherein a surface area of the exposed outside surface is substantially larger than a cross-sectional area of the base section.

* * * * *